Dec. 8, 1931.    F. M. COVEY    1,835,849
AIRCRAFT PROPELLER
Filed Feb. 28, 1930
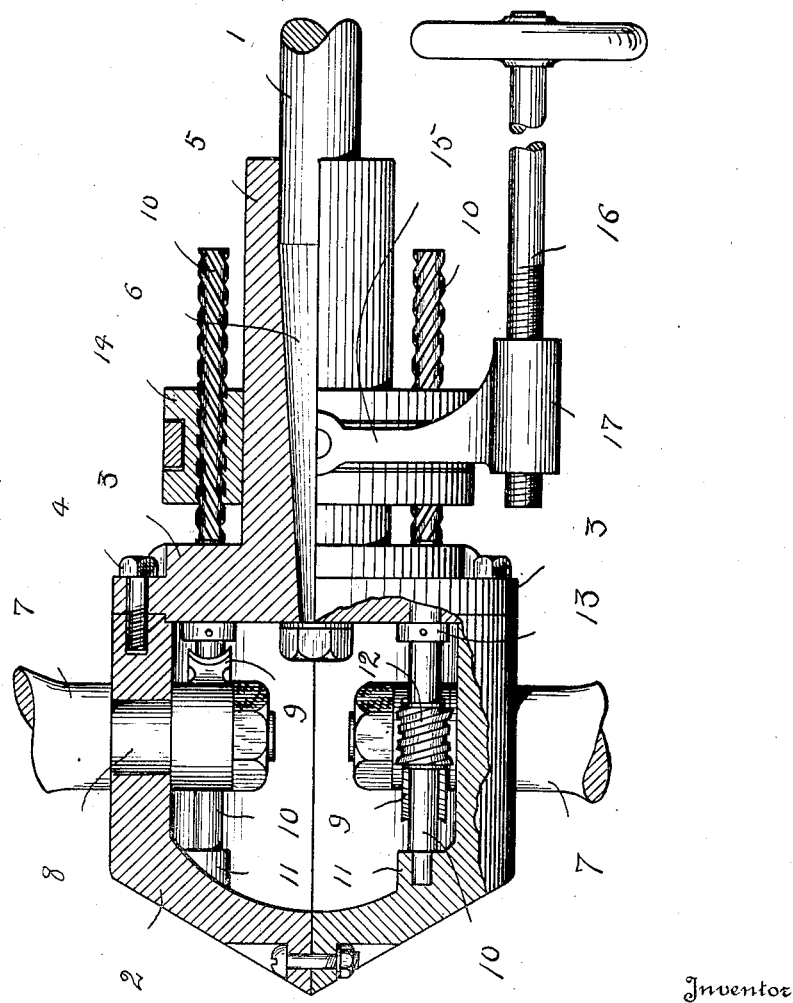
Inventor
Felix M. Covey.
By
Geo. Stevens
Attorney

UNITED STATES PATENT OFFICE

FELIX M. COVEY, OF DULUTH, MINNESOTA

AIRCRAFT PROPELLER

Application filed February 28, 1930. Serial No. 432,112.

This invention relates to adjustable screw propellers, and to those particularly adaptable for use upon air craft; the instant invention being a modification and improvement over that shown in my copending application filed Jan. 24, 1930, Ser. No. 423,088.

The principal object of the invention is to provide a more simple, practical and efficient device of this type, and other objects and advantages will appear in the following description of the invention.

The accompanying drawing, forming part of this application and wherein like reference characters indicate like parts, is a partial section and elevation of a propeller hub and associated parts equipped with the blade adjusting mechanism in accordance with the invention.

1 represents the driving shaft of the propeller which extends outboard of the engine housing of the aircraft. 2 represents the hollow propeller hub, that portion of which connects the shaft to the hub comprising the flange-like head 3 which is attached as by the bolts 4 to the inner face of the hub and provided with the hollow sleeve 5 into which the tapered end 6 of the shaft 1 is securely fastened. The hub proper is illustrated at 2 and shown as comprising two like separable halves for convenience in assembly, though such construction may not be essential to the successful operation of the device.

7 represents the shanks of the propeller blades, trunnioned as at 8 within the walls of the hub, and inwardly of the hub are each fitted in any suitable manner with a segmentally shaped worm gear 9, they being preferably disposed upon opposite sides of their respective trunnions within the hub so that the weight of same may not unbalance the structure as a unit.

Through the head 3 and upon opposite sides of the sleeve 5 are rotatably mounted the spindles 10 each extending transverse and adjacent the inward extension of the trunnions 8 and journalled in the front wall of the hub as at 11. Meshing with each worm gear 9 and carried upon their respective spindles 10 are worms 12, they being fixed to the spindles so that any rotative action of the latter will correspondingly rotate the blades of the propeller. A set collar 13 is mounted upon each spindle 10 as a thrust bearing for same against the head 3, and the bearing 11 of each spindle is reduced in size in respect to the spindle for a like effect against movement of the spindles in the opposite direction.

That portion of the spindles 10 extending outwardly of the head 3 and parallel with the sleeve 5 are externally screw threaded as illustrated, the pitch of said threaded portion being suitable for the purpose of rotating same when the collar 14 is reciprocable upon the sleeve 5, and through which collar the spindles extend as clearly illustrated.

The reciprocation of the collar 14 may be accomplished in any desired manner, but I have shown as a simple means the reciprocable fork like member 15 mounted within the collar 14, it being of the common clutch-like structure and directly operable upon the inclined rotative shaft 16, journalled in any desired manner convenient of access to the operator of the aircraft; the shaft 16 being of course provided with suitable fixed bearings not shown.

The art of selectively featherable propeller blades is old and well known so that it is not deemed essential to here enter the description of same. However the operation of my present invention is accomplished as follows:

When it becomes desired to change the angle of the propeller blades, rotative action of the shaft 16 will cause the hub 17 of the fork 15 to travel either one way or the other in accordance with the direction of rotation of the threaded shaft 16, thus moving the collar 14 in the desired direction, which, as before described, will cause rotation of the spindles 10, and the direction of rotation of these spindles is obviously governed by the predetermined pitch of the threads in relation to the specific arrangement and direction of threads of the cooperatng parts. The spindles thus being rotated will correspondingly rotate the gudgeons of the propeller blades, resulting in any desired pitch of the latter being readily accomplished.

Having thus described my invention, what

I claim and desire to secure by Letters Patent, is:

1. A propeller blade feathering mechanism including a propeller shaft, a hub carried by said shaft, a sleeve-like extension from the hub about said shaft, propeller blades having shanks trunnioned within the opposite walls of the hub, a worm gear carried by each shank within the hub, rotatable spindles extending through the hub parallel with and spaced from the sleeve extension, a worm carried by each spindle meshing with its respective worm wheel, reciprocable means carried by the sleeve for simultaneously rotating the spindles, and means for selectively operating the reciprocable means.

2. The combination with a hollow propeller hub fixed to the end of a driving shaft and having rotatably adjustable blades extending within the hub, of rotatable spindles disposed parallel with the shaft and extending into the hub, means for imparting rotary motion to the propeller blades from their respective spindles, and means reciprocable longitudinally the shaft for simultaneously rotating the spindles.

In testimony whereof I affix my signature.

FELIX M. COVEY.